US011900811B2

(12) United States Patent
Sato

(10) Patent No.: US 11,900,811 B2
(45) Date of Patent: Feb. 13, 2024

(54) CROWDSOURCING ROAD CONDITIONS FROM ABNORMAL VEHICLE EVENTS

(71) Applicant: Micron Technology, Inc., Boise, ID (US)

(72) Inventor: Junichi Sato, Yokohama (JP)

(73) Assignee: Lodestar Licensing Group LLC, Evanston, IL (US)

( * ) Notice: Subject to any disclaimer, the term of this patent is extended or adjusted under 35 U.S.C. 154(b) by 0 days.

(21) Appl. No.: 17/719,635

(22) Filed: Apr. 13, 2022

(65) Prior Publication Data

US 2022/0238022 A1 Jul. 28, 2022

Related U.S. Application Data

(63) Continuation of application No. 16/784,554, filed on Feb. 7, 2020, now Pat. No. 11,328,599.

(51) Int. Cl.

*G08G 1/127* (2006.01)
*H04W 4/46* (2018.01)
*G08G 1/16* (2006.01)

(52) U.S. Cl.

CPC ............ *G08G 1/164* (2013.01); *G08G 1/127* (2013.01); *G08G 1/166* (2013.01)

(58) Field of Classification Search

None
See application file for complete search history.

(56) References Cited

U.S. PATENT DOCUMENTS 9,849,882 B2 12/2017 Byun
9,870,649 B1 1/2018 Fields et al.
9,881,272 B2 1/2018 Mitchell et al.
10,019,901 B1 7/2018 Fields et al.
10,096,240 B2 10/2018 Byun
10,895,463 B1 1/2021 Cope et al.
(Continued)

FOREIGN PATENT DOCUMENTS

CN 101587637 11/2009
JP H0668392 3/1994
(Continued)

OTHER PUBLICATIONS

International Search Report and Written Opinion, PCT/US2021/016555, dated May 26, 2021.

*Primary Examiner* — John F Mortell
(74) *Attorney, Agent, or Firm* — Greenberg Traurig

(57) ABSTRACT

A system for crowdsourcing reporting of road conditions from abnormal vehicle events. Abnormal vehicle events (such as sudden braking, sharp turns, evasive actions, pothole impact, etc.) can be detected and reported to a road condition monitoring system (RCMS). The RCMS can identify patterns in reported road conditions to generate advisory information or instructions for vehicles and users of vehicles. For example, suspected obstacles can be identified and used to instruct a driver or a vehicle to slow down gradually to avoid sudden braking and sharp turns. In some examples, a vehicle can have a camera that can upload an image of a suspected obstacle (e.g., a pothole) to allow the positive identification of a road problem. This provides the RCMS with more confidence to take a corrective action, such as an automated call to a road repair service.

18 Claims, 6 Drawing Sheets

(56) References Cited

U.S. PATENT DOCUMENTS

| | | | | |
|---|---|---|---|---|
| 10,994,727 | B1 * | 5/2021 | Kumar | G06Q 30/0213 |
| 11,328,599 | B2 | 5/2022 | Sato | |
| 2013/0096816 | A1 * | 4/2013 | Takano | B62D 15/0275 701/400 |
| 2014/0067265 | A1 | 3/2014 | Maston | |
| 2014/0111354 | A1 | 4/2014 | Hergesheimer et al. | |
| 2016/0133131 | A1 | 5/2016 | Grimm et al. | |
| 2016/0335813 | A1 | 11/2016 | Hergesheimer et al. | |
| 2018/0137698 | A1 | 5/2018 | Yasuda | |
| 2018/0244275 | A1 * | 8/2018 | Bremkens | G08G 1/0968 |
| 2019/0011916 | A1 * | 1/2019 | Alvarez Rodriguez | B62D 15/0255 |
| 2019/0130742 | A1 * | 5/2019 | Tokunaga | G08G 1/09 |
| 2019/0310651 | A1 * | 10/2019 | Vallespi-Gonzalez | G05D 1/0221 |
| 2020/0042802 | A1 | 2/2020 | Nishimura et al. | |
| 2020/0090502 | A1 * | 3/2020 | Yang | G08G 1/0112 |
| 2020/0247412 | A1 * | 8/2020 | Wang | B60W 50/14 |
| 2021/0248908 | A1 | 8/2021 | Sato | |

FOREIGN PATENT DOCUMENTS

| | | |
|---|---|---|
| JP | 2018205845 | 12/2018 |
| KR | 100692241 | 3/2007 |

* cited by examiner

CROWDSOURCING ROAD CONDITIONS FROM ABNORMAL VEHICLE EVENTS

RELATED APPLICATIONS

The present application is a continuation application of U.S. patent application Ser. No. 16/784,554, filed Feb. 7, 2020, the entire disclosure of which application is hereby incorporated herein by reference.

FIELD OF THE TECHNOLOGY

At least some embodiments disclosed herein relate to crowdsourcing reporting of road conditions from abnormal vehicle events.

BACKGROUND

Crowdsourcing is a sourcing model in which entities can obtain services from a large, growing, and evolving group of Internet users. Crowdsourcing delegates work or processes between participants to achieve a cumulative result. A key advantage of crowdsourcing is that unceasing tasks can be performed in parallel by large crowds of users.

Crowdsourcing has been used to improve navigation information and driving. For example, crowdsourcing has been used to improve traffic buildup information found in navigation apps. In such examples, the crowdsourced participants can be vehicle drivers. Crowdsourcing is just one of many technologies improving driving.

Another way to improve driving is via an advanced driver assistance system (ADAS). An ADAS is an electronic system that helps a driver of a vehicle while driving. An ADAS provides for increased car safety and road safety. An ADAS can use electronic technology, such as electronic control units and power semiconductor devices. Most road accidents occur due to human error; thus, an ADAS, which automates some control of the vehicle, can reduce human error and road accidents. Such systems have been designed to automate, adapt and enhance vehicle systems for safety and improved driving. Safety features of an ADAS are designed to avoid collisions and accidents by offering technologies that alert the driver to potential problems, or to avoid collisions by implementing safeguards and taking over control of the vehicle. Adaptive features may automate lighting, provide adaptive cruise control and collision avoidance, provide pedestrian crash avoidance mitigation (PCAM), alert driver to other cars or dangers, provide a lane departure warning system, provide automatic lane centering, show field of view in blind spots, or connect to navigation systems.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
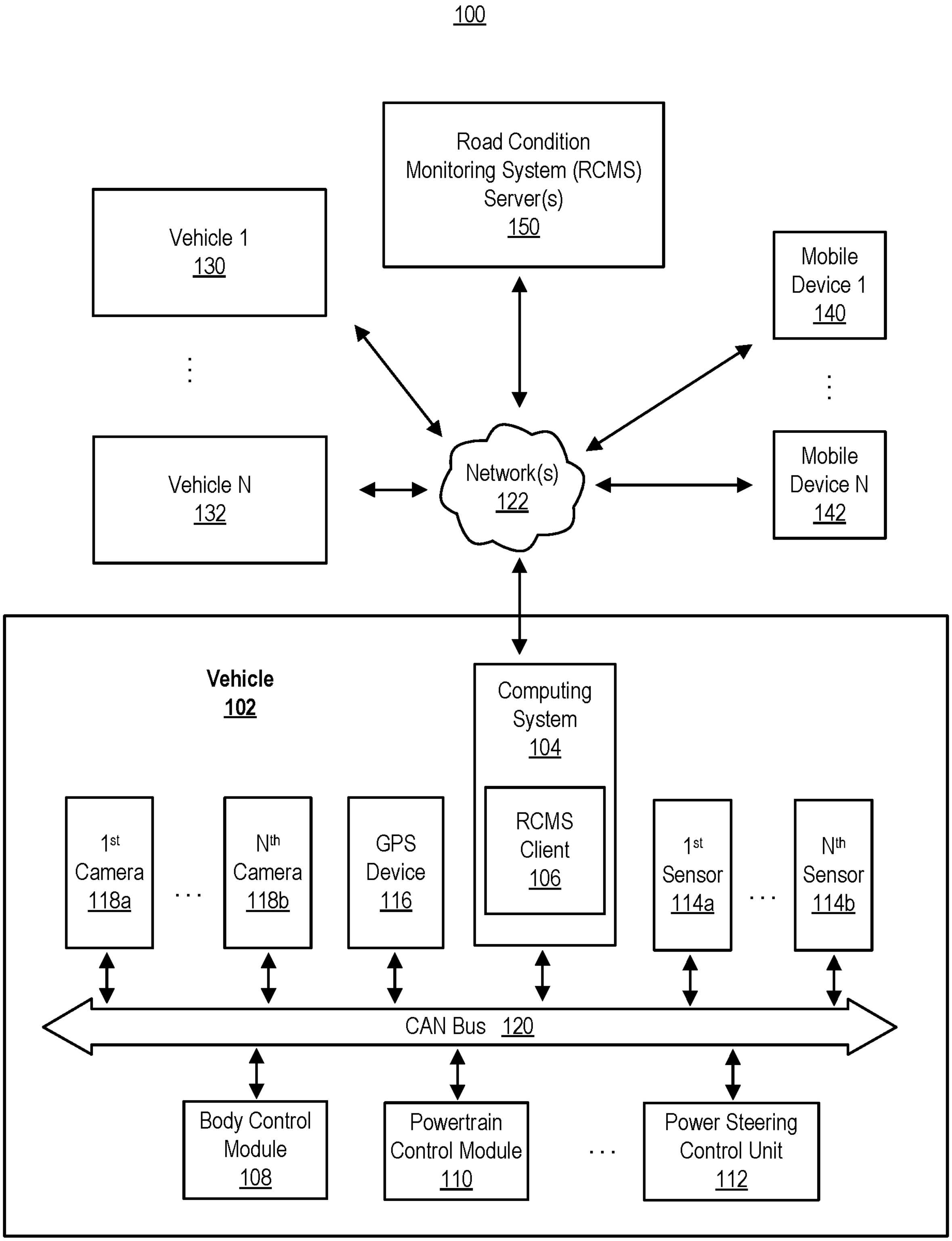
FIGS. 1 to 3 illustrate an example networked system that includes at least mobile devices and vehicles as well as a road condition monitoring system (RCMS) and that is configured to implement crowdsourcing reporting of road conditions from abnormal vehicle events, in accordance with some embodiments of the present disclosure.

At least some embodiments disclosed herein relate to crowdsourcing reporting of road conditions from abnormal vehicle events. Abnormal vehicle events (such as sudden braking, sharp turns, evasive actions, pothole impact, etc.) can be detected and reported to one or more servers of a road condition monitoring system (RCMS). The RCMS can include servers in a cloud computing environment, for example, and can identify patterns in reported road conditions to generate advisory information or instructions to vehicles and users of vehicles. For example, suspected obstacles can be identified and used to instruct a driver or a vehicle to slow down gradually to avoid sudden braking and sharp turns. In some embodiments, a vehicle having a camera can upload an image of a suspected obstacle (e.g., a pothole) to allow the positive identification of a road problem, so that the RCMS can schedule a road service to remedy the problem.

Vehicles can be equipped with a plurality of sensors that can detect abnormal vehicle events, such as sudden braking, sharp turns, evasive actions, and pothole impact. Vehicles can transmit corresponding information along with precise geolocation information to a cloud or another type of group of computers working together (such as via peer to peer computing). Each vehicle's transmission of such data can be one or more data points for a determination of road conditions or hazards. The determination can be made in the cloud or via a peer to peer computing environment, for example. The determinations can be used to generate advisories that are reported to the vehicles participating in the system. The advisories can be presented by UI of the vehicle or of a mobile device of a user in the vehicle. An advisory can be distributed according to the geolocation of the determined condition or hazard and matching geolocations of vehicles approaching the geolocation of the determined condition or hazard.

In addition, or as an alternative to the advisory, the vehicle can be sent instructions or data on the road condition or hazard when the vehicle is approaching the geolocation of the condition or hazard. And, the vehicle can adjust its components according to the distributed instructions or data on the road condition or hazard. This is beneficial for many reasons. For example, a user cannot see a series of potholes in time if traveling fast on the highway, but a corresponding notification or instructions can be used as a basis for instructing the vehicle to deaccelerate automatically in a safe and reasonable manner as the vehicle approaches the road condition or hazard. Additionally, the system can provide the corresponding advisory to the user via a UI. So, the driver is not perplexed by the slowing of the vehicle.

In general, road conditions are sensed and sent by vehicles to a central computing system such as one or more servers of the RCMS. The corresponding data is processed and advisories and/or instructions are generated and distributed accordingly. The driver can receive such advisories and the vehicle itself can receive such information and automatically be adjusted accordingly. Then, the vehicle driving through or proximate to the road condition or hazard can provide feedback to the central computing system (or in other words the RCMS). The feedback can be used to train and improve the centralize computing system and subsequent generation of advisories and instructions for vehicular automated adjustments.

Other actions can be taken as well from the crowd sourcing provided by participating vehicles. Images of road conditions and hazards can be recorded by cameras on the vehicles, and redundancy of the images and other such data can legitimize an action provided by the RCMS. For example, images of road conditions and hazards can be recorded by cameras on the vehicles, and redundancy of the images and other such data can legitimize the credibility of a call for service or other types of responding actions such as dispatch of repair or cleaning services.

One or more servers of the RCMS can pool the information from reporting vehicles, vehicles that report events, and vehicles that use information from the server. The server(s) do not need to receive the raw data and diagnose the abnormal conditions. The sever(s) can receive already processed information, which is processed by the vehicles. The vehicles can process the raw data from the sensors and cameras and make the diagnosis. The vehicles can then send the diagnoses to the server(s) of the RCMS for further analysis and generation of advisories. The server(s) of the RCMS are not merely a router that broadcasts the information received from one vehicle to another. The server(s) can synthesize the reports from a population of reporting vehicles to make its distributed information more reliable and meaningful.

Also, reporting vehicles can have a level of intelligence in diagnosing the abnormal conditions and thus reduce the data traffic in reporting. If a condition does not warrant a notification, then the report on the condition does not need to be sent from the vehicle to the server(s) of the RCMS. The information sent from the server to the receiving vehicles can be instructional, consultative, and/or informative. The receiving vehicles could have a level of intelligence in using the information instead of simply receiving it and acting accordingly (such as merely setting off an alert after receiving the information).

In some embodiments, a vehicle can include a body, a powertrain, and a chassis as well as at least one sensor attached to at least one of the body, the powertrain, or the chassis, or any combination thereof. The at least one sensor can be configured to: detect at least one abrupt movement of the vehicle or of at least one component of the vehicle, and send movement data derived from the detected at least one abrupt movement. The vehicle can also include a global positioning system (GPS) device, configured to: detect a geographical position of the vehicle during the detection of the at least one abrupt movement, and send position data derived from the detected geographical position. The vehicle can also include a computing system, configured to: receive the movement data and the position data, and link the received movement data with the received position data. The computing system can also be configured to determine whether the detected at least one abrupt movement in the received movement data exceeds an abrupt movement threshold. In some embodiments, the determination can be according to artificial intelligence (AI). And, the computing system can be configured to train the AI using machine learning. For example, the AI can include an artificial neural network (ANN) and the computing system can be configured to train the ANN. The computing system can also be configured to, in response to the determination that the at least one abrupt movement exceeds an abrupt movement threshold, send the linked data or a derivative thereof to a road condition monitoring system. The linked data or a derivative thereof can be sent via a wide area network by the computing system.

In such embodiments and others, the vehicle can also include at least one camera, configured to record at least one image of an area within a preselected distance of the vehicle, during the detection of the at least one abrupt movement. And, the at least one camera can also be configured to send image data derived from the recorded at least one image. And, in such examples, the computing system can be configured to receive the image data and link the received image data with the received movement data and the received position data. In response to the determination that the at least one abrupt movement exceeds an abrupt movement threshold, the computing system can also be configured to send, via the wide area network, the linked image data or a derivative thereof to the road condition monitoring system along with the linked movement and position data.

In such embodiments and others, the road condition monitoring system can include at least one processor and at least one non-transitory computer readable medium having instructions executable by the at least one processor to perform a method—such as a method for providing crowdsourcing reporting of road conditions from abnormal vehicle events. Such a method can include receiving movement data and geographical position data from respective computing systems in abruptly-moved vehicles. Such a method can also include determining geographical positions of hazardous conditions in roads according to the received movement data and the received geographical position data. In some embodiments, the determination of geographical positions of hazardous conditions can be according to AI. And, the method can include training the AI using machine learning. For example, the AI can include an ANN and the method can include training the ANN.

The method can also include generating hazard information according to at least the received movement data and the received geographical position data (e.g., the hazard information can include instructional data). The generation of the hazard information can also be according to AI; and, the method can include training such AI using machine learning. For example, the AI can include an ANN and the method can include training the ANN. The method can also include sending a part of the hazard information to a computing system in a hazard-approaching vehicle when the hazard-approaching vehicle is approaching one position of the determined geographical positions of the hazardous conditions and is within a preselected distance of the one position.

In such embodiments and others, the computing system of the vehicle can be configured to receive and process data (e.g., including instructional data) from the road condition monitoring system via the wide area network. And, the data can include information derived from at least linked movement and position data sent from other vehicles that were in a geographic position that the vehicle is approaching. The computing system of the vehicle can be configured to process the received data via AI; and such AI can be trained by the computing system. And, the AI can include an ANN, and the ANN can be trained by the computing system. Also, from the received and processed data, the driver or the vehicle can take corrective actions with the vehicle.

In summary, described herein is a system for crowdsourcing reporting of road conditions from abnormal vehicle events. Abnormal vehicle events (such as sudden braking, sharp turns, evasive actions, pothole impact, etc.) can be detected and reported to a RCMS. The RCMS can identify patterns in reported road conditions to generate advisory information or instructions for vehicles and users of vehicles. For example, suspected obstacles can be identified and used to instruct a driver or a vehicle to slow down gradually to avoid sudden braking and sharp turns. In some examples, a vehicle can have a camera that can upload an image of a suspected obstacle (e.g., a pothole) to allow the positive identification of a road problem. This provides the RCMS with more confidence to take a corrective action, such as an automated call to a road repair service.

Figure 2:
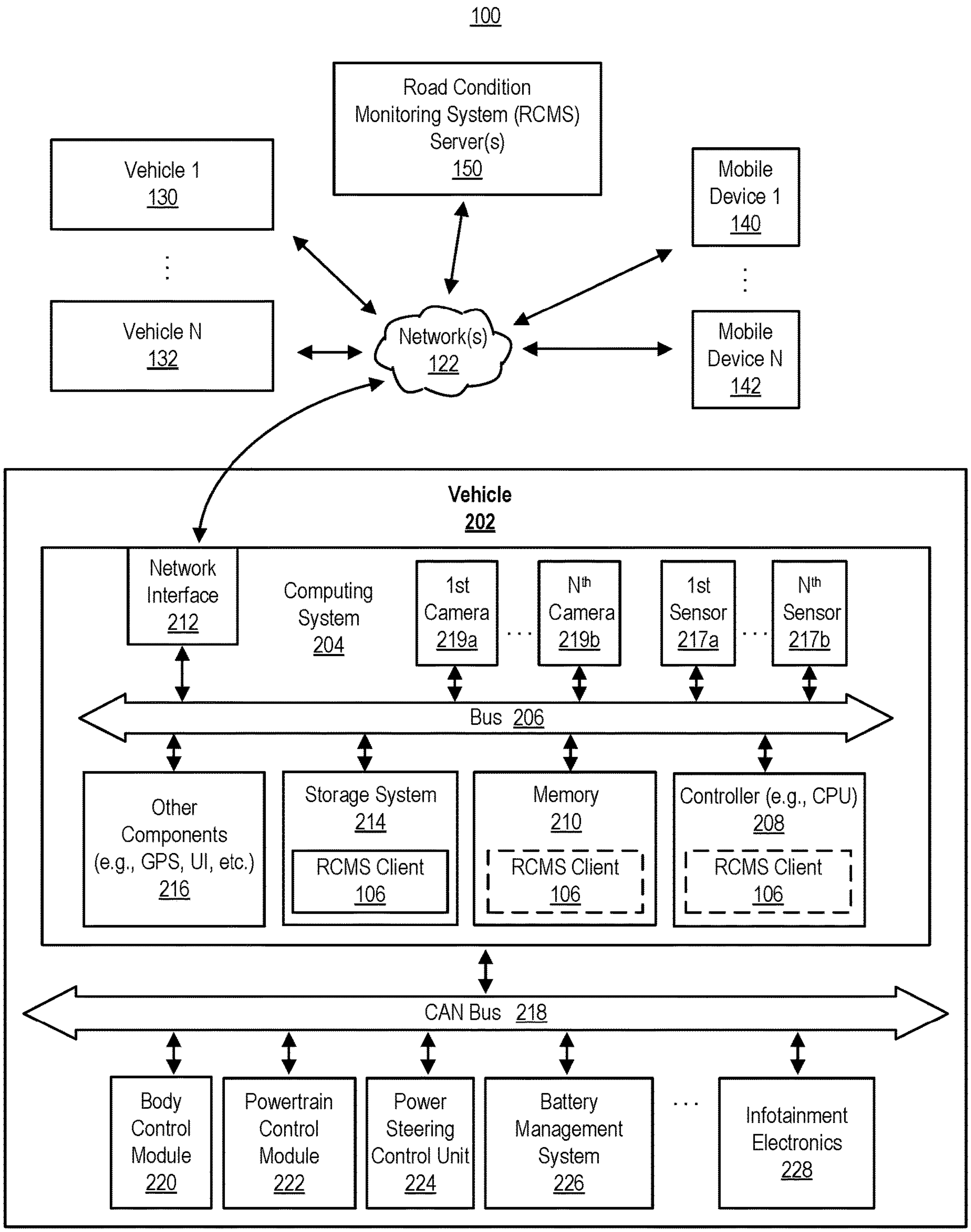
Figure 3:
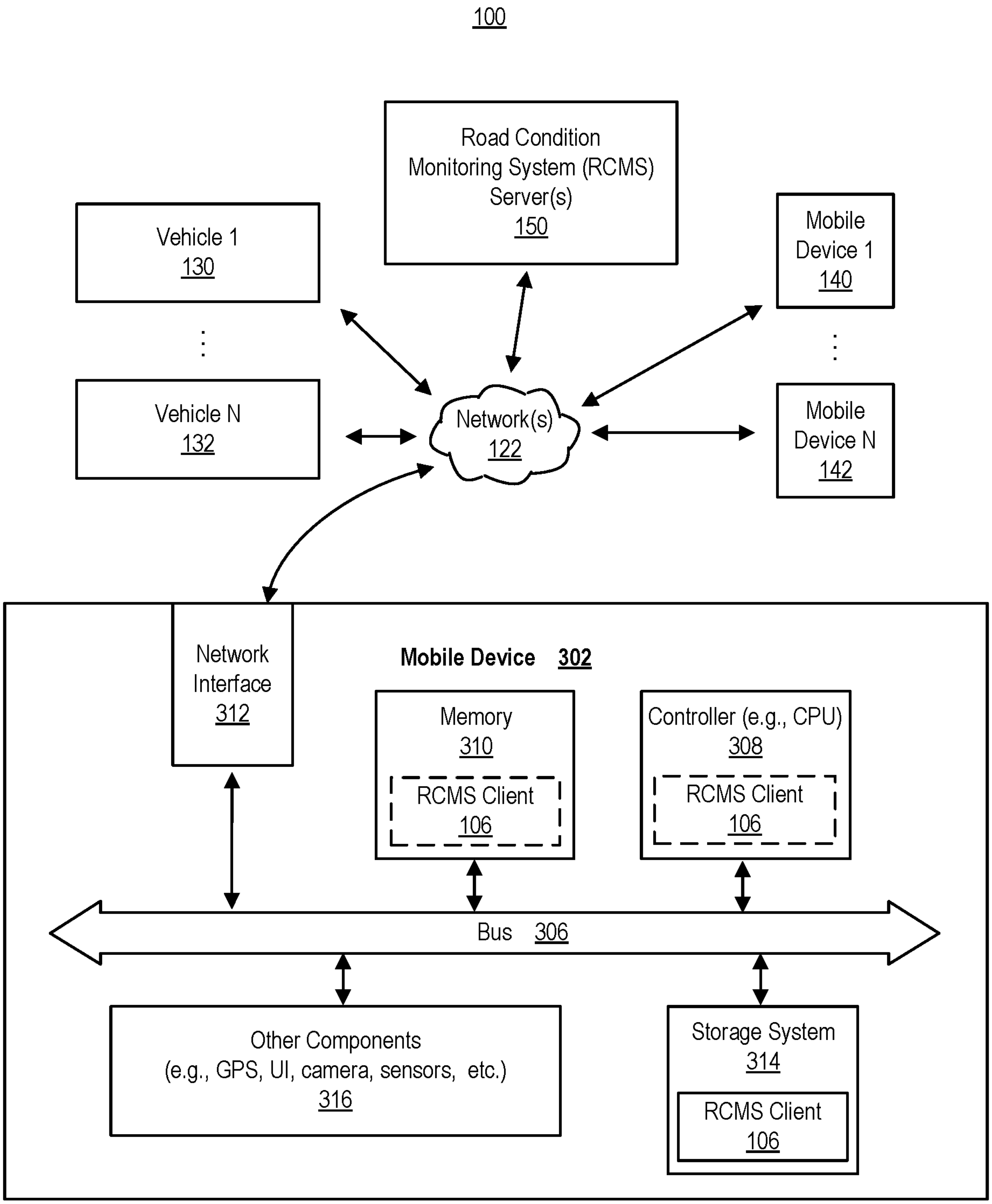

FIGS. 1 to 3 illustrate an example networked system 100 that includes at least an RCMS as well as mobile devices and vehicles (e.g., see mobile devices 140 to 142 and 302 and vehicles 102, 202, and 130 to 132) and that is configured to implement crowdsourcing reporting of road conditions from abnormal vehicle events, in accordance with some embodiments of the present disclosure.

The networked system 100 is networked via one or more communications networks 122. Communication networks described herein, such as communications network(s) 122, can include at least a local to device network such as Bluetooth or the like, a wide area network (WAN), a local area network (LAN), the Intranet, a mobile wireless network such as 4G or 5G, an extranet, the Internet, and/or any combination thereof. Nodes of the networked system 100 (e.g., see mobile devices 140, 142, and 302, vehicles 102, 130, 132, and 202, and one or more RCMS servers 150) can each be a part of a peer-to-peer network, a client-server network, a cloud computing environment, or the like. Also, any of the apparatuses, computing devices, vehicles, sensors or cameras, and/or user interfaces described herein can include a computer system of some sort (e.g., see computing systems 104 and 204). And, such a computer system can include a network interface to other devices in a LAN, an intranet, an extranet, and/or the Internet. The computer system can also operate in the capacity of a server or a client machine in client-server network environment, as a peer machine in a peer-to-peer (or distributed) network environment, or as a server or a client machine in a cloud computing infrastructure or environment.

As shown in FIG. 1, the networked system 100 can include at least a vehicle 102 that includes a vehicle computing system 104 (including a client application 106 of the RCMS—also referred to herein as the RCMS client 106), a body and controllable parts of the body (not depicted), a powertrain and controllable parts of the powertrain (not depicted), a body control module 108 (which is a type of ECU), a powertrain control module 110 (which is a type of ECU), and a power steering control unit 112 (which is a type of ECU). The vehicle 102 also includes a plurality of sensors (e.g., see sensors 114*a* to 114*b*), a GPS device 116, a plurality of cameras (e.g., see cameras 118*a* to 118*b*), and a controller area network (CAN) bus 120 that connects at least the vehicle computing system 104, the body control module 108, the powertrain control module 110, the power steering control unit 112, the plurality of sensors, the GPS device 116, and the plurality of cameras to each other. Also, as shown, the vehicle 102 is connected to the network(s) 122 via the vehicle computing system 104. Also, shown, vehicles 130 to 132 and mobile devices 140 to 142 are connected to the network(s) 122. And, thus, are communicatively coupled to the vehicle 102.

The RCMS client 106 included in the computing system 104 can communicate with the RCMS server(s) 150. The RCMS client 106 can be a part of, include, or be connected to an ADAS; and thus, the ADAS can also communicate with the RCMS server(s) 150 (not depicted).

In some embodiments, the vehicle 102 can include a body, a powertrain, and a chassis, as well as at least one sensor (e.g., see sensors 114*a* to 114*b*). The at least one sensor can be attached to at least one of the body, the powertrain, or the chassis, or any combination thereof. The at least one sensor can be configured to: detect at least one abrupt movement of the vehicle 102 or of at least one component of the vehicle, and send movement data derived from the detected at least one abrupt movement. An abrupt movement can include a change in velocity, acceleration, angular velocity, or angular acceleration, or any combination thereof that exceeds a predetermined threshold. For example, an abrupt movement can include a change in velocity, acceleration, angular velocity, or angular acceleration, or any combination thereof in a certain one or more directions that exceeds a corresponding predetermined threshold for the one or more directions.

As shown, the vehicle 102 also includes the GPS device 116. The GPS device 116 can be configured to: detect a geographical position of the vehicle 102 during the detection of the at least one abrupt movement, and send position data derived from the detected geographical position. The vehicle 102 also includes the computing system 104 (which includes the RCMS client 106), and the computing system (such as via the RCMS client 106) can be configured to receive the movement data and the position data. The computing system 104 (such as via the RCMS client 106) can also be configured to: link the received movement data with the received position data, and determine whether the detected at least one abrupt movement in the received movement data exceeds an abrupt movement threshold. In some embodiments, the determination can be according to artificial intelligence (AI). And, the computing system 104 (such as via the RCMS client 106) can be configured to train the AI using machine learning. For example, the AI can include an ANN and the computing system 104 (such as via the RCMS client 106) can be configured to train the ANN. The computing system 104 (such as via the RCMS client 106) can also be configured to, in response to the determination that the at least one abrupt movement exceeds an abrupt movement threshold, send the linked data or a derivative thereof to the RCMS. For example, the linked data or a derivative thereof can be sent, by the computing system 104, to the RCMS server(s) 150 via a part of the network(s) 122.

In such embodiments and others, the vehicle 102 can include at least one camera (e.g., see cameras 118*a* to 118*b*). The at least one camera can be configured to: record at least one image of an area within a preselected distance of the vehicle 102 during the detection of the at least one abrupt movement, and send image data derived from the recorded at least one image. Also, the at least one camera can be configured to: record at least one image of an area within a preselected distance of the vehicle 102 during a predetermined period of time after the at least one abrupt movement, and send image data derived from the recorded at least one image recording the at least one abrupt movement. In such embodiments and others, the computing system 104 (such as via the RCMS client 106) can be configured to: receive the image data, and link the received image data with the received movement data and the received position data. And, in response to the determination that the at least one abrupt movement exceeds an abrupt movement threshold, the computing system 104 (such as via the RCMS client 106) can be configured to send, via the wide area network (e.g., see network(s) 122), the linked image data or a derivative thereof to the RCMS along with the linked movement and position data. For example, the linked data or a derivative thereof can be sent, by the computing system 104 (such as via the RCMS client 106), to the RCMS server(s) 150 via a part of the network(s) 122.

In such embodiments and others, the computing system 104 (such as via the RCMS client 106) can be configured to receive and process data (e.g., such as data including instructional data) from the RCMS via the wide area network. For example, the data can be received, by the computing system 104 (such as via the RCMS client 106), from the RCMS server(s) 150 via a part of the network(s) 122, and then the received data can be processed. The received data can include information derived from at least linked movement and position data sent from other vehicles (e.g., see vehicles 130 to 132) that were in a geographic position that the vehicle 102 is approaching. In some embodiments, the derivation of the received data and/or the later processing of the received data is according to AI, and the AI can be trained by a computing system of the RCMS and/or the vehicle.

In such embodiments and others, the vehicle 102 can include a user interface (such as a graphical user interface) configured to provide at least part of the received and processed data to a user of the vehicle (e.g., see other components 216 of vehicle 202 depicted in FIG. 2, which can include a GUI).

Also, the vehicle 102 can include an ECU configured to receive at least part of the received and processed data via the computing system 104 (such as via the RCMS client 106). The ECU can also be configured to control, via at least one electrical system in the vehicle, steering of the vehicle according to the at least part of the received and processed data (e.g., see power steering control unit 112). The ECU can also be configured to control, via at least one electrical system in the vehicle 102, deacceleration of the vehicle according to the at least part of the received and processed data (e.g., see powertrain control module 110). The ECU can also be configured to control, via at least one electrical system in the vehicle 102, acceleration of the vehicle according to the at least part of the received and processed data (e.g., see powertrain control module 110). Also, the vehicle 102 can include one or more ECUs configured to receive at least part of the received and processed data via the computing system 104 (such as via the RCMS client 106). The ECU(s) can also be configured to control, via at least one electrical system in the vehicle 102, at least one of steering of the vehicle, deacceleration of the vehicle, or acceleration of the vehicle, or any combination thereof according to the at least part of the received and processed data (e.g., see body control module 108, powertrain control module 110, and power steering control unit 112).

In such embodiments and others, a system (such as the RCMS) can include at least one processor and at least one non-transitory computer readable medium having instructions executable by the at least one processor to perform a method (e.g., see RCMS server(s) 150). The method performed can include receiving movement data and geographical position data from computing systems in abruptly-moved vehicles (e.g., see computing systems 104 and 204 of vehicles 102 and 202 respectively). In some examples, the method can include determining geographical positions of hazardous conditions in roads according to the received movement data and the received geographical position data; and, such a determination can be according to AI and the AI can be trained via machine learning and can include an ANN. The method can include generating hazard information (such as hazard information including instructional data) according to at least the received movement data and the received geographical position data. In some examples, the information can pertain to determined geographical positions of the hazardous conditions. The generation of the information can be according to AI and the AI can be trained via machine learning and can include an ANN. The method can also include sending a part of the hazard information to a computing system in a hazard-approaching vehicle (e.g., see computing systems 104 and 204) when the hazard-approaching vehicle is approaching one position of the determined geographical positions of the hazardous conditions and is within a preselected distance of the one position.

In such embodiments and others, the part of the hazard information can be configured to at least provide a basis to alert a user of the hazard-approaching vehicle via a user interface in the hazard-approaching vehicle. Also, the part of the hazard information can be configured to at least provide a basis to control, via at least one electrical system in the hazard-approaching vehicle, steering, deacceleration, and acceleration of the hazard-approaching vehicle.

Also, the received movement data can include respective movement data sent from a respective abruptly-moved vehicle. The respective movement data can be derived from sensed abrupt movement of the abruptly-moved vehicle. The received position data can include respective position data sent from the abruptly-moved vehicle. And, the respective position data can be associated with a position of the abruptly-moved vehicle upon the sensing of the abrupt movement.

Further, the method performed by the system (such as the RCMS) can include receiving image data from the computing systems in the abruptly-moved vehicles. And, the determining the geographical positions of the hazardous conditions can be according to the received image data, the received movement data, and the received geographical position data. The determining the geographical positions of the hazardous conditions can also be according to AI and the AI can be trained via machine learning and can include an ANN. Also, the image data can include respective image data derived from at least one image of an area within a preselected distance of the abruptly-moved vehicle, and the at least one image can be recorded upon the sensing of the abrupt movement or within a predetermined period of time after the sensing of the abrupt movement. The part of the hazard information can the respective image data and can be configured to at least provide a basis to alert a user of the hazard-approaching vehicle via a user interface in the hazard-approaching vehicle as well as show an image of a hazard rendered from the respective image data.

The vehicle 102 includes vehicle electronics, including at least electronics for the controllable parts of the body, the controllable parts of the powertrain, and the controllable parts of the power steering. The vehicle 102 includes the controllable parts of the body and such parts and subsystems being connected to the body control module 108. The body includes at least a frame to support the powertrain. A chassis of the vehicle can be attached to the frame of the vehicle. The body can also include an interior for at least one driver or passenger. The interior can include seats. The controllable parts of the body can also include one or more power doors and/or one or more power windows. The body can also include any other known parts of a vehicle body. And, the controllable parts of the body can also include a convertible top, sunroof, power seats, and/or any other type of controllable part of a body of a vehicle. The body control module 108 can control the controllable parts of the body.

Also, the vehicle 102 also includes the controllable parts of the powertrain. The controllable parts of the powertrain and its parts and subsystems are connected to the powertrain control module 110. The controllable parts of the powertrain can include at least an engine, transmission, drive shafts, suspension and steering systems, and powertrain electrical systems. The powertrain can also include any other known parts of a vehicle powertrain and the controllable parts of the powertrain can include any other known controllable parts of a powertrain. Also, power steering parts that are controllable can be controlled via the power steering control unit 112.

UI elements described herein, such as UI elements of a mobile device or a vehicle can include any type of UI. The UI elements can be, be a part of, or include a car control. For example, a UI can be a gas pedal, a brake pedal, or a steering wheel. Also, a UI can be a part of or include an electronic device and/or an electrical-mechanical device and can be a part of or include a tactile UI (touch), a visual UI (sight), an auditory UI (sound), an olfactory UI (smell), an equilibria UI (balance), or a gustatory UI (taste), or any combination thereof.

The plurality of sensors (e.g., see sensors 114*a* to 114*b*) and/or the plurality of cameras (e.g., see cameras 118*a* to 118*b*) of the vehicle 102 can include any type of sensor or camera respectively configured to sense and/or record one or more features or characteristics of the plurality of UI elements or output thereof or any other part of the vehicle 102 or its surroundings. A sensor or a camera of the vehicle 102 can also be configured to generate data corresponding to the one or more features or characteristics of the plurality of UI elements or output thereof or any other part of the vehicle 102 or its surroundings according to the sensed and/or recorded feature(s) or characteristic(s). A sensor or a camera of the vehicle 102 can also be configured to output the generated data corresponding to the one or more features or characteristics. Any one of the plurality of sensors or cameras can also be configured to send, such as via the CAN bus 120, the generated data corresponding to the one or more features or characteristics to the computing system 104 or other electronic circuitry of the vehicle 102 (such as the body control module 108, the powertrain control module 110, and the power steering control unit 112).

A set of mechanical components for controlling the driving of the vehicle 102 can include: (1) a brake mechanism on wheels of the vehicle (for stopping the spinning of the wheels), (2) a throttle mechanism on an engine or motor of the vehicle (for regulation of how much gas goes into the engine, or how much electrical current goes into the motor), which determines how fast a driving shaft can spin and thus how fast the vehicle can run, and (3) a steering mechanism for the direction of front wheels of the vehicle (for example, so the vehicle goes in the direction of where the wheels are pointing to). These mechanisms can control the braking (or deacceleration), acceleration (or throttling), and steering of the vehicle 102. The user indirectly controls these mechanism by UI elements (e.g., see other components 216 of vehicle 202 shown in FIG. 2) that can be operated upon by the user, which are typically the brake pedal, the acceleration pedal, and the steering wheel. The pedals and the steering wheel are not necessarily mechanically connected to the driving mechanisms for braking, acceleration and steering. Such parts can have or be proximate to sensors that measure how much the driver has pressed on the pedals and/or turned the steering wheel. The sensed control input is transmitted to the control units over wires (and thus can be drive-by-wire). Such control units can include body control module 108 or 220, powertrain control module 110 or 222, power steering control unit 112 or 224, battery management system 226, etc. Such output can also be sensed and/or recorded by the sensors and cameras described herein (e.g., see sensors 114*a* to 114*b* or 217*a* to 217*b* and cameras 118*a* to 118*b* or 219*a* to 219*b*). And, the output of the sensors and cameras can be further processed, such as by the RCMS client 106, and then reported to the server(s) 150 of the RCMS for cumulative data processing.

In some embodiments, the vehicle 102 or 202 can include a body, a powertrain, and a chassis. The vehicle 102 or 202 can also include a plurality of electronic control units (ECUs) configured to control driving of the vehicle (e.g., see body control module 108 or 220, powertrain control module 110 or 222, and power steering control unit 112 or 224). The vehicle 102 or 202 can also include a plurality of user UI elements configured to be manipulated by a driver to indicate degrees of control exerted by the driver (e.g., see other components 216 of vehicle 202 shown in FIG. 2). The plurality of UI elements can be configured to measure signals indicative of the degrees of control exerted by the driver. The plurality of UI elements can also be configured to transmit the signals electronically to the plurality of ECUs. The ECUs (e.g., see body control module 108 or 220, powertrain control module 110 or 222, and power steering control unit 112 or 224) can be configured to generate control signals for driving the vehicle 102 or 202 based on the measured signals received from the plurality of UI elements.

In a vehicle, such as vehicle 102 or 202, a driver can control the vehicle via physical control elements (e.g., steering wheel, brake pedal, gas pedal, paddle gear shifter, etc.) that interface drive components via mechanical linkages and some electro-mechanical linkages. However, more and more vehicles currently have the control elements interface the mechanical powertrain elements (e.g., brake system, steering mechanisms, drive train, etc.) via electronic control elements or modules (e.g., electronic control units or ECUs). The electronic control elements or modules can be a part of drive-by-wire technology.

Drive-by-wire technology can include electrical or electro-mechanical systems for performing vehicle functions traditionally achieved by mechanical linkages. The technology can replace the traditional mechanical control systems with electronic control systems using electromechanical actuators and human-machine interfaces such as pedal and steering feel emulators. Components such as the steering column, intermediate shafts, pumps, hoses, belts, coolers and vacuum servos and master cylinders can be eliminated from the vehicle. There are varying degrees and types of drive-by-wire technology.

Vehicles, such as vehicles 102 and 202, having drive-by-wire technology can include a modulator (such as a modulator including or being a part of an ECU and/or an ADAS) that receives input from a user or driver (such as via more conventional controls or via drive-by-wire controls or some combination thereof). The modulator can then use the input of the driver to modulate the input or transform it to match input of a “safe driver”. The input of a “safe driver” can be represented by a model of a “safe driver”.

The vehicle 102 and 202 can also include an ADAS (not depicted). And, as mentioned herein, the RCMS client 106 can be a part of, include, or be connected to the ADAS. And, thus, the ADAS can also communicate with the RCMS server(s) 150 (not depicted). The ADAS can be configured to identify a pattern of the driver interacting with the UI elements (e.g., see other components 216 which include UI elements). The ADAS can also be configured to determine a deviation of the pattern from a predetermined model (e.g., a predetermined regular-driver model, predetermined safe-driver model, etc.). In such embodiments and others, the predetermined model can be derived from related models of preselected safe drivers. Also, the predetermined model can be derived from related models for drivers having a preselected driver competence level. The predetermined model can also be derived from related models for drivers having a preselected driving habit. The predetermined model can also be derived from related models for drivers having a preselected driving style. And, the predetermined model can also be derived from a combination thereof.

The ADAS can also be configured to adjust the plurality of ECUs (e.g., see body control module 108 or 220, powertrain control module 110 or 222, and power steering control unit 112 or 224) in converting the signals measured by the UI elements to the control signals for driving the vehicle 102 or 202 according to the deviation. For example, the ADAS can be configured to change a transfer function used by the ECUs to control driving of the vehicle based on the deviation.

In such embodiments and others, the ADAS can be further configured to adjust the plurality of ECUs (e.g., body control module 108, powertrain control module 110, and power steering control unit 112) in converting the signals measured by the UI elements to the control signals for driving the vehicle 102 or 202 according to sensor data indicative of environmental conditions of the vehicle. And, the ADAS can be further configured to determine response differences between the measured signals generated by the plurality of UI elements and driving decisions generated autonomously by the ADAS according to the predetermined model and the sensor data indicative of environmental conditions of or surrounding the vehicle 102 or 202 (e.g., see sensors and cameras of the vehicles in FIGS. 1 and 2). Also, the ADAS can be further configured to train an ANN to identify the deviation based on the response differences. In such embodiments and others, for the determination of the deviation, the ADAS can be configured to input the transmitted signals indicative of the degrees of control into an ANN. And, the ADAS can be configured to determine at least one feature of the deviation based on output of the ANN. Also, to train the determination of the deviation, the ADAS can be configured to train the ANN. To train the ANN, the ADAS can be configured to adjust the ANN based on the deviation.

In such embodiments and others, the plurality of UI can include a steering control (e.g., a steering wheel or a GUI or another type of UI equivalent such as a voice input UI for steering). Also, the plurality of UI can include a braking control (e.g., a brake pedal or a GUI or another type of UI equivalent such as a voice input UI for braking). The plurality of UI can also include a throttling control (e.g., a gas pedal or a GUI or another type of UI equivalent such as a voice input UI for accelerating the vehicle). And, the degrees of control exerted by the driver can include detected user interactions with at least one of the steering control, the braking control, or the throttling control, or any combination thereof. In such embodiments and others, the ADAS can be configured to change a transfer function used by the ECUs (e.g., body control module 108 or 220, powertrain control module 110 or 222, and power steering control unit 112 or 224) to control driving of the vehicle 102 or 202 based on the deviation. And, the transfer function can include or be derived from at least one transfer function for controlling at least one of a steering mechanism of the vehicle 102 or 202, a throttle mechanism of the vehicle, or a braking mechanism of the vehicle, or any combination thereof. Also, the plurality of UI can include a transmission control (e.g., manual gearbox and driver-operated clutch or a GUI or another type of UI equivalent such as a voice input UI for changing gears of the vehicle). And, the degrees of control exerted by the driver can include detected user interactions with the transmission control. The transfer function can include or be derived from a transfer function for controlling a transmission mechanism of the vehicle 102 or 202.

In some embodiments, the electronic circuitry of a vehicle (e.g., see vehicles 102 and 202), which can include or be a part of the computing system of the vehicle, can include at least one of engine electronics, transmission electronics, chassis electronics, passenger environment and comfort electronics, in-vehicle entertainment electronics, in-vehicle safety electronics, or navigation system electronics, or any combination thereof (e.g., see body control modules 108 and 220, powertrain control modules 110 and 222, power steering control units 112 and 224, battery management system 226, and infotainment electronics 228 shown in FIGS. 1 and 2 respectively). In some embodiments, the electronic circuitry of the vehicle can include electronics for an automated driving system.

Aspects for driving the vehicle 102 or 202 that can be adjusted can include driving configurations and preferences adjustable from a controller via automotive electronics (such as adjustments in the transmission, engine, chassis, passenger environment, and safety features via respective automotive electronics). The driving aspects can also include typical driving aspects and/or drive-by-wire aspects, such as giving control to steering, braking, and acceleration of the vehicle (e.g., see the body control module 108, the powertrain control module 110, and the power steering control unit 112). Aspects for driving a vehicle can also include controlling settings for different levels of automation according to the SAE, such as control to set no automation preferences/configurations (level 0), driver assistance preferences/configurations (level 1), partial automation preferences/configurations (level 2), conditional automation preferences/configurations (level 3), high automation preferences/configurations (level 4), or full preferences/configurations (level 5). Aspects for driving a vehicle can also include controlling settings for driving mode such as sports or performance mode, fuel economy mode, tow mode, all-electric mode, hybrid mode, AWD mode, FWD mode, RWD mode, and 4WD mode.

In some embodiments, the computing system of the vehicle (such as computing system 104 or 204) can include a central control module (CCM), central timing module (CTM), and/or general electronic module (GEM). Also, in some embodiments, the vehicle can include an ECU, which can be any embedded system in automotive electronics that controls one or more of the electrical systems or subsystems in the vehicle. Types of ECU can include engine control module (ECM), powertrain control module (PCM), transmission control module (TCM), brake control module (BCM or EBCM), CCM, CTM, GEM, body control module (BCM), suspension control module (SCM), door control unit (DCU), or the like. Types of ECU can also include power steering control unit (PSCU), one or more human-machine interface (HMI) units, powertrain control module (PCM)—which can function as at least the ECM and TCM, seat control unit, speed control unit, telematic control unit, transmission control unit, brake control module, and battery management system.

As shown in FIG. 2, the networked system 100 can include at least vehicles 130 to 132 and vehicle 202 which includes at least a vehicle computing system 204, a body (not depicted) having an interior (not depicted), a powertrain (not depicted), a climate control system (not depicted), and an infotainment system (not depicted). The vehicle 202 can include other vehicle parts as well.

The computing system 204, which can have similar structure and/or functionality as the computing system 104, can be connected to communications network(s) 122 that can include at least a local to device network such as Bluetooth or the like, a wide area network (WAN), a local area network (LAN), an intranet, a mobile wireless network such as 4G or 5G, an extranet, the Internet, and/or any combination thereof. The computing system 204 can be a machine capable of executing a set of instructions (sequential or otherwise) that specify actions to be taken by that machine. Also, while a single machine is illustrated for the computing system 204, the term "machine" shall also be taken to include any collection of machines that individually or jointly execute a set (or multiple sets) of instructions to perform a methodology or operation. And, it can include at least a bus (e.g., see bus 206) and/or motherboard, one or more controllers (such as one or more CPUs, e.g., see controller 208), a main memory (e.g., see memory 210) that can include temporary data storage, at least one type of network interface (e.g., see network interface 212), a storage system (e.g., see data storage system 214) that can include permanent data storage, and/or any combination thereof. In some multi-device embodiments, one device can complete some parts of the methods described herein, then send the result of completion over a network to another device such that another device can continue with other steps of the methods described herein.

FIG. 2 also illustrates example parts of the computing system 204 that can include and implement the RCMS client 106. The computing system 204 can be communicatively coupled to the network(s) 122 as shown. The computing system 204 includes at least a bus 206, a controller 208 (such as a CPU) that can execute instructions of the RCMS client 106, memory 210 that can hold the instructions of the RCMS client 106 for execution, a network interface 212, a data storage system 214 that can store instructions for the RCMS client 106, and other components 216—which can be any type of components found in mobile or computing devices such as GPS components, I/O components such as a camera and various types of user interface components (which can include one or more of the plurality of UI elements described herein) and sensors (which can include one or more of the plurality of sensors described herein). The other components 216 can include one or more user interfaces (e.g., GUIs, auditory user interfaces, tactile user interfaces, car controls, etc.), displays, different types of sensors, tactile, audio and/or visual input/output devices, additional application-specific memory, one or more additional controllers (e.g., GPU), or any combination thereof. The computing system 204 can also include sensor and camera interfaces that are configured to interface sensors and cameras of the vehicle 202 which can be one or more of any of the sensors or cameras described herein (e.g., see sensors 217*a* to 217*b* and cameras 219*a* to 219*b*). The bus 206 communicatively couples the controller 208, the memory 210, the network interface 212, the data storage system 214, the other components 216, and the sensors and cameras as well as sensor and camera interfaces in some embodiments. The computing system 204 includes a computer system that includes at least controller 208, memory 210 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 214, which communicate with each other via bus 206 (which can include multiple buses).

In some embodiments, the computing system 204 can include a set of instructions, for causing a machine to perform any one or more of the methodologies discussed herein, when executed. In such embodiments, the machine can be connected (e.g., networked via network interface 212) to other machines in a LAN, an intranet, an extranet, and/or the Internet (e.g., network(s) 122). The machine can operate in the capacity of a server or a client machine in client-server network environment, as a peer machine in a peer-to-peer (or distributed) network environment, or as a server or a client machine in a cloud computing infrastructure or environment.

Controller 208 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 208 can also be one or more special-purpose processing devices such as an ASIC, a programmable logic such as an FPGA, a digital signal processor (DSP), network processor, or the like. Controller 208 is configured to execute instructions for performing the operations and steps discussed herein. Controller 208 can further include a network interface device such as network interface 212 to communicate over one or more communications network (such as network(s) 122).

The data storage system 214 can include a machine-readable storage medium (also known as a computer-readable medium) on which is stored one or more sets of instructions or software embodying any one or more of the methodologies or functions described herein. The data storage system 214 can have execution capabilities such as it can at least partly execute instructions residing in the data storage system. The instructions can also reside, completely or at least partially, within the memory 210 and/or within the controller 208 during execution thereof by the computer system, the memory 210 and the controller 208 also constituting machine-readable storage media. The memory 210 can be or include main memory of the system 204. The memory 210 can have execution capabilities such as it can at least partly execute instructions residing in the memory.

The vehicle 202 can also have vehicle body control module 220 of the body, powertrain control module 222 of the powertrain, a power steering control unit 224, a battery management system 226, infotainment electronics 228 of the infotainment system, and a CAN bus 218 that connects at least the vehicle computing system 204, the vehicle body control module, the powertrain control module, the power steering control unit, the battery management system, and the infotainment electronics. Also, as shown, the vehicle 202 is connected to the network(s) 122 via the vehicle computing system 204. Also, shown, vehicles 130 to 132 and mobile devices 140 to 142 are connected to the network(s) 122. And, thus, are communicatively coupled to the vehicle 202.

The vehicle 202 is also shown having the plurality of sensors (e.g., see sensors 217*a* to 217*b*) and the plurality of cameras (e.g., see cameras 219*a* to 219*b*), which can be part of the computing system 204. In some embodiments, the CAN bus 218 can connect the plurality of sensors and the plurality of cameras, the vehicle computing system 204, the vehicle body control module, the powertrain control module, the power steering control unit, the battery management system, and the infotainment electronics to at least the computing system 204. The plurality of sensors and the plurality of cameras can be connected to the computing system 204 via sensor and camera interfaces of the computing system.

As shown in FIG. 3, the networked system 100 can include at least a mobile device 302 as well as mobile devices 140 to 142. The mobile device 302, which can have somewhat similar structure and/or functionality as the computing system 104 or 204, can be connected to communications network(s) 122. And, thus, be connected to vehicles 102, 202, and 130 to 132 as well as mobile devices 140 to 142. The mobile device 302 (or mobile device 140 or 142) can include one or more of the plurality of sensors mentioned herein, one or more of the plurality of UI elements mentioned herein, a GPS device, and/or one or more of the plurality of cameras mentioned herein. Thus, the mobile device 302 (or mobile device 140 or 142) can act similarly to computing system 104 or 204 and can host and run the RCMS client 106.

The mobile device 302, depending on the embodiment, can be or include a mobile device or the like, e.g., a smartphone, tablet computer, IoT device, smart television, smart watch, glasses or other smart household appliance, in-vehicle information system, wearable smart device, game console, PC, digital camera, or any combination thereof. As shown, the mobile device 302 can be connected to communications network(s) 122 that includes at least a local to device network such as Bluetooth or the like, a wide area network (WAN), a local area network (LAN), an intranet, a mobile wireless network such as 4G or 5G, an extranet, the Internet, and/or any combination thereof.

Each of the mobile devices described herein can be or be replaced by a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. The computing systems of the vehicles described herein can be a machine capable of executing a set of instructions (sequential or otherwise) that specify actions to be taken by that machine.

Also, while a single machine is illustrated for the computing systems and mobile devices described herein, the term "machine" shall also be taken to include any collection of machines that individually or jointly execute a set (or multiple sets) of instructions to perform any one or more of the methodologies or operations discussed herein. And, each of the illustrated mobile devices can each include at least a bus and/or motherboard, one or more controllers (such as one or more CPUs), a main memory that can include temporary data storage, at least one type of network interface, a storage system that can include permanent data storage, and/or any combination thereof. In some multi-device embodiments, one device can complete some parts of the methods described herein, then send the result of completion over a network to another device such that another device can continue with other steps of the methods described herein.

FIG. 3 also illustrates example parts of the mobile device 302, in accordance with some embodiments of the present disclosure. The mobile device 302 can be communicatively coupled to the network(s) 122 as shown. The mobile device 302 includes at least a bus 306, a controller 308 (such as a CPU), memory 310, a network interface 312, a data storage system 314, and other components 316 (which can be any type of components found in mobile or computing devices such as GPS components, I/O components such as various types of user interface components, and sensors (such as biometric sensors) as well as one or more cameras). The other components 316 can include one or more user interfaces (e.g., GUIs, auditory user interfaces, tactile user interfaces, etc.), displays, different types of sensors, tactile (such as biometric sensors), audio and/or visual input/output devices, additional application-specific memory, one or more additional controllers (e.g., GPU), or any combination thereof. The bus 306 communicatively couples the controller 308, the memory 310, the network interface 312, the data storage system 314 and the other components 316. The mobile device 302 includes a computer system that includes at least controller 308, memory 310 (e.g., read-only memory (ROM), flash memory, dynamic random-access memory (DRAM) such as synchronous DRAM (SDRAM) or Rambus DRAM (RDRAM), static random-access memory (SRAM), cross-point memory, crossbar memory, etc.), and data storage system 314, which communicate with each other via bus 306 (which can include multiple buses).

To put it another way, FIG. 3 is a block diagram of mobile device 302 that has a computer system in which embodiments of the present disclosure can operate. In some embodiments, the computer system can include a set of instructions, for causing a machine to perform some of the methodologies discussed herein, when executed. In such embodiments, the machine can be connected (e.g., networked via network interface 312) to other machines in a LAN, an intranet, an extranet, and/or the Internet (e.g., network(s) 122). The machine can operate in the capacity of a server or a client machine in client-server network environment, as a peer machine in a peer-to-peer (or distributed) network environment, or as a server or a client machine in a cloud computing infrastructure or environment.

Controller 308 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, single instruction multiple data (SIMD), multiple instructions multiple data (MIMD), or a processor implementing other instruction sets, or processors implementing a combination of instruction sets. Controller 308 can also be one or more special-purpose processing devices such as an ASIC, a programmable logic such as an FPGA, a digital signal processor (DSP), network processor, or the like. Controller 308 is configured to execute instructions for performing the operations and steps discussed herein. Controller 308 can further include a network interface device such as network interface 312 to communicate over one or more communications network (such as network(s) 122).

The data storage system 314 can include a machine-readable storage medium (also known as a computer-readable medium) on which is stored one or more sets of instructions or software embodying any one or more of the methodologies or functions described herein. The data storage system 314 can have execution capabilities such as it can at least partly execute instructions residing in the data storage system. The instructions can also reside, completely or at least partially, within the memory 310 and/or within the controller 308 during execution thereof by the computer system, the memory 310 and the controller 308 also constituting machine-readable storage media. The memory 310 can be or include main memory of the device 302. The memory 310 can have execution capabilities such as it can at least partly execute instructions residing in the memory.

While the memory, controller, and data storage parts are shown in example embodiments to each be a single part, each part should be taken to include a single part or multiple parts that can store the instructions and perform their respective operations. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

As shown in FIG. 3, the mobile device 302 can include a user interface (e.g., see other components 316). The user interface can be configured to provide a graphical user interface (GUI), a tactile user interface, or an auditory user interface, or any combination thereof. For example, the user interface can be or include a display connected to at least one of a wearable structure, a computing device, or a camera or any combination thereof that can also be a part of the mobile device 302, and the display can be configured to provide a GUI. Also, embodiments described herein can include one or more user interfaces of any type, including tactile UI (touch), visual UI (sight), auditory UI (sound), olfactory UI (smell), equilibria UI (balance), and gustatory UI (taste).

Figure 4:
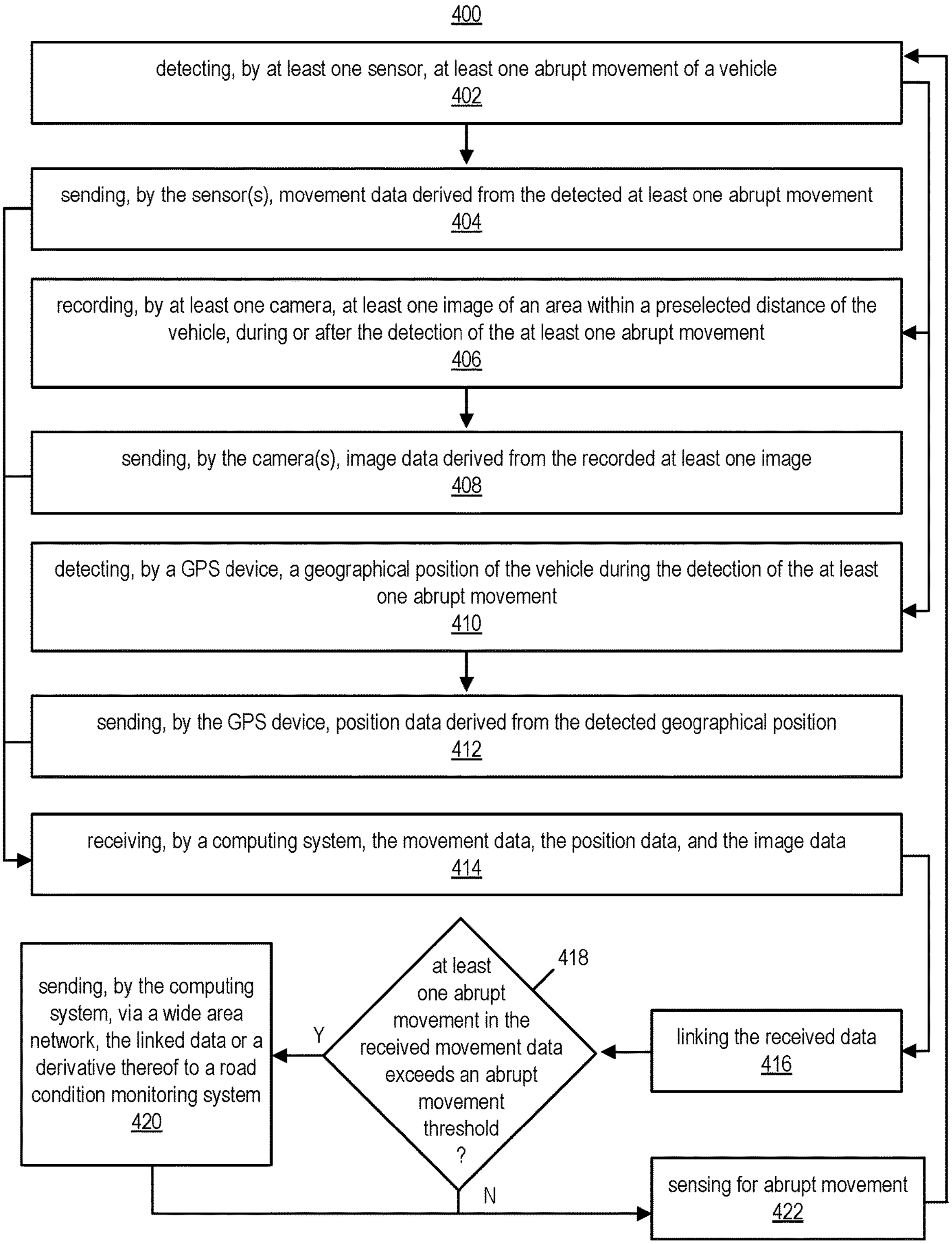
FIGS. 4 to 6 illustrate flow diagrams of example operations that can be performed by aspects of the networked system depicted in FIGS. 1 to 3, in accordance with some embodiments of the present disclosure.

FIG. 4 illustrates a flow diagram of example operations of method 400 that can be performed by aspects of the networked system depicted in FIGS. 1 to 3, in accordance with some embodiments of the present disclosure. For example, the method 400 can be performed by a computing system and/or other parts of any vehicle and/or mobile device depicted in FIGS. 1 to 3.

In FIG. 4, the method 400 begins at step 402 with detecting, by at least one sensor, at least one abrupt movement of the vehicle or of at least one component of the vehicle. An abrupt movement can include a change in velocity, acceleration, angular velocity, or angular acceleration, or any combination thereof that exceeds a predetermined threshold. For example, an abrupt movement can include a change in velocity, acceleration, angular velocity, or angular acceleration, or any combination thereof in a certain one or more directions that exceeds a corresponding predetermined threshold for the one or more directions.

At step 404, the method 400 continues with sending, by the sensor(s), movement data derived from the detected at least one abrupt movement. At step 406, the method 400 continues recording, by at least one camera, at least one image of an area within a preselected distance of the vehicle, during or after the detection of the at least one abrupt movement. At step 408, the method 400 continues with sending, by the camera(s), image data derived from the recorded at least one image. At step 410, the method 400 continues with detecting, by a GPS device, a geographical position of the vehicle during the detection of the at least one abrupt movement. At step 412, the method 400 continues with sending, by the GPS device, position data derived from the detected geographical position. At step 414, the method 400 continues with receiving, by a computing system, the movement data, the position data, and the image data. At step 416, the method 400 continues with linking, by the computing system, the received movement data, the received position data, and the received image data. At step 418, the method 400 continues with determining, by the computing system, whether the detected at least one abrupt movement in the received movement data exceeds an abrupt movement threshold. In some embodiments, the determination can be according to AI and the AI can be trained via machine learning. In response to the determination that the at least one abrupt movement exceeds an abrupt movement threshold at 418, the method 400 continues with sending, via a wide area network, the linked data or a derivative thereof to a road condition monitoring system (at step 420). Otherwise, the method 400 can return to sensing for abrupt movement of the vehicle or of at least one component of the vehicle at step 422 and return to step 402 when an abrupt movement is sensed. This way, if the abrupt movement is not significant enough, resources for processing and sending of sensed or recorded data are not used. In other words, this allows for efficient crowdsourcing reporting to the RCMS of road conditions from abnormal vehicle events.

Figure 5:
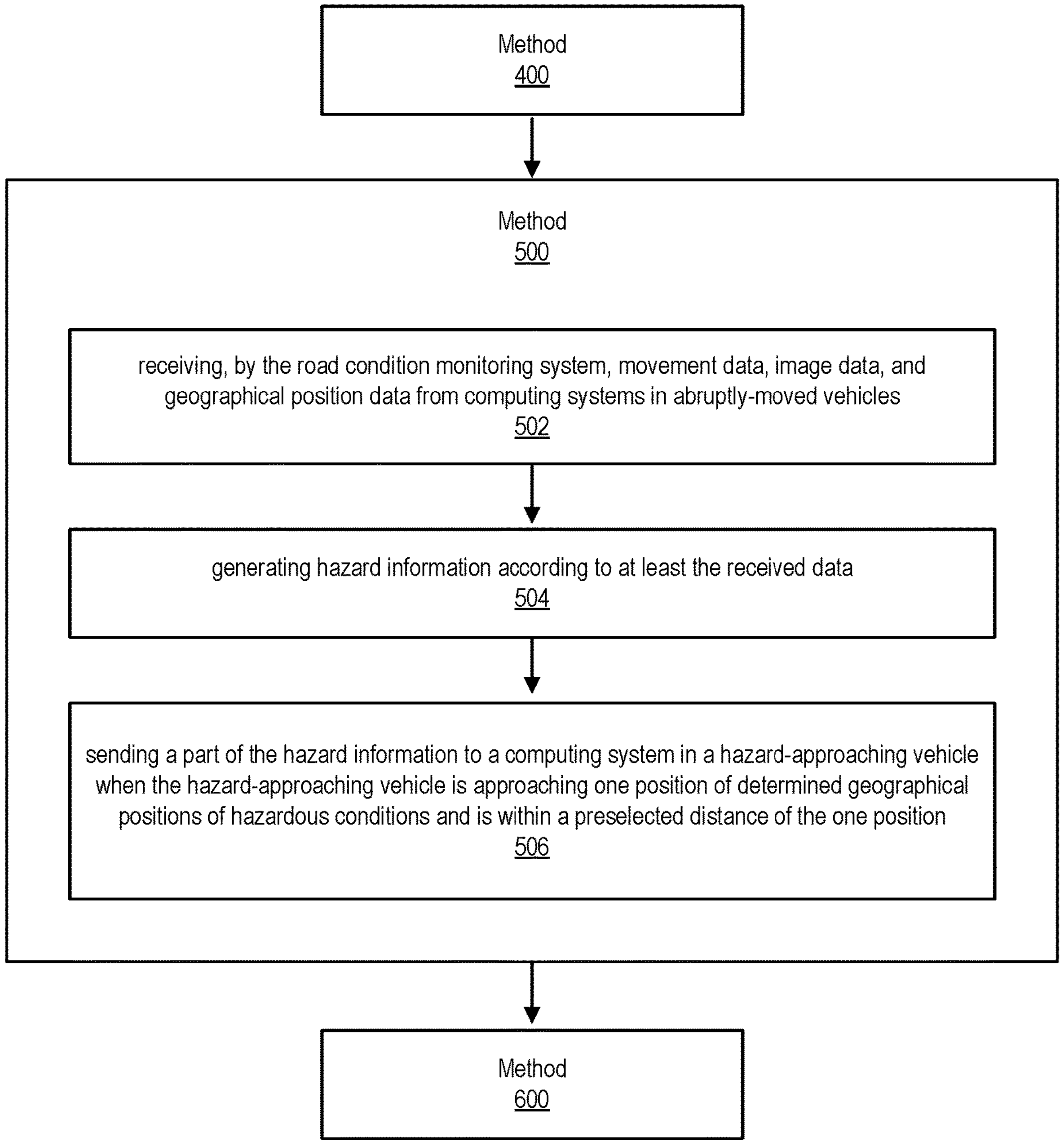

FIG. 5 illustrates a flow diagram of example operations of method 500 that can be performed by aspects of the networked system depicted in FIGS. 1 to 3, in accordance with some embodiments of the present disclosure. For example, the method 500 can be performed by a computing system and/or other parts of any vehicle and/or mobile device depicted in FIGS. 1 to 3. As shown, the method 500 can begin subsequent to method 400, and step 502 can depend on the occurrence of step 420 of method 400. At step 502, the method 500 begins with receiving, by the road condition monitoring system, movement data, image data, and geographical position data from computing systems in abruptly-moved vehicles. At step 504, the method 500 continues with generating hazard information according to at least the received movement data, image data, and geographical position data. At step 506, the method 500 continues with sending a part of the hazard information to a computing system in a hazard-approaching vehicle when the hazard-approaching vehicle is approaching one position of determined geographical positions of hazardous conditions and is within a preselected distance of the one position. Also, as shown, the method 600 depicted in FIG. 6 can occur after the method 500.

Figure 6:
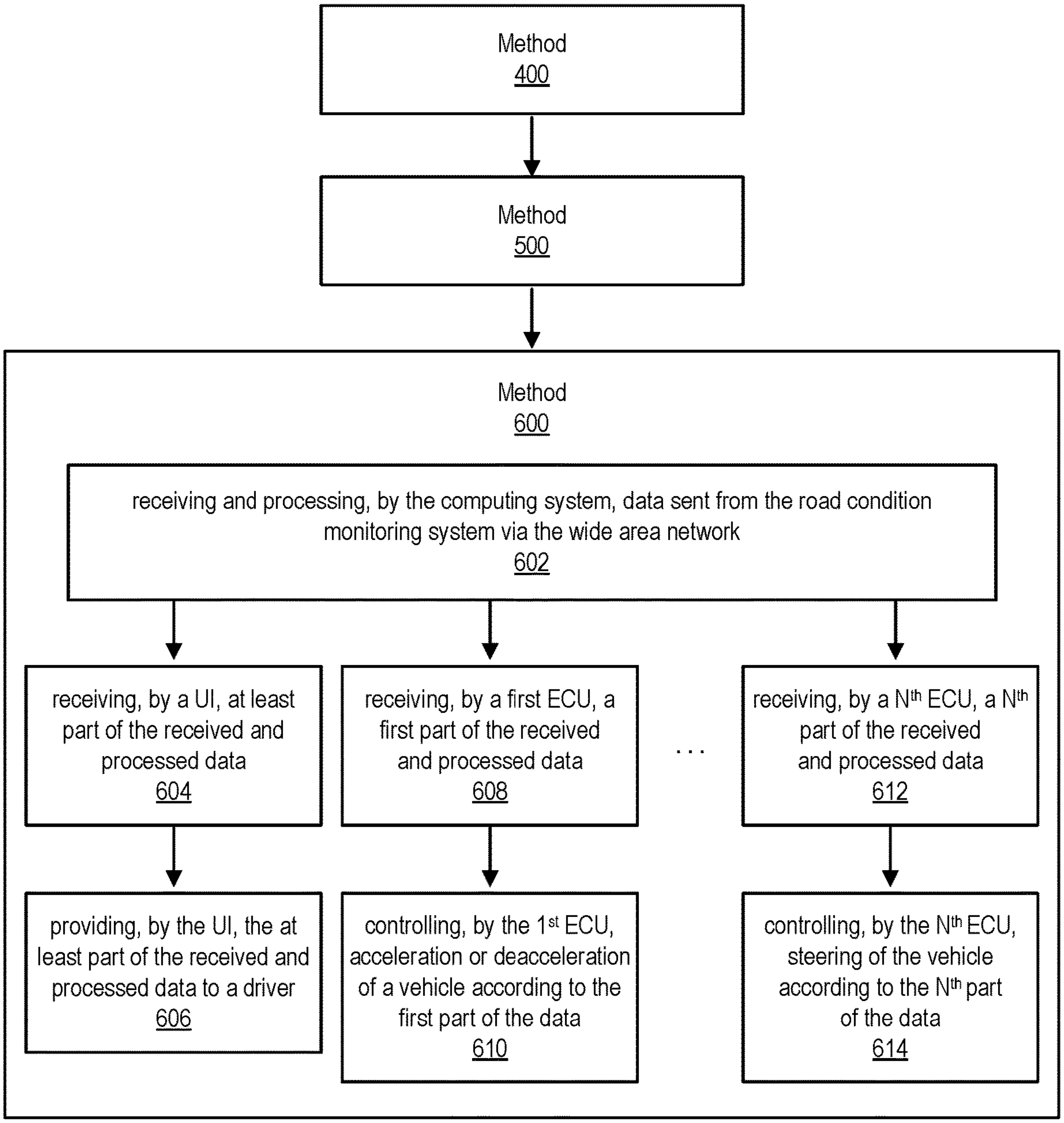

FIG. 6 illustrates a flow diagram of example operations of method 600 that can be performed by aspects of the networked system depicted in FIGS. 1 to 3, in accordance with some embodiments of the present disclosure. For example, the method 600 can be performed by a computing system and/or other parts of any vehicle and/or mobile device depicted in FIGS. 1 to 3. As shown, the method 600 can begin subsequent to method 500, and step 602 can depend on the occurrence of step 506 of method 500. At step 602, the method 600 begins with receiving and processing, by the computing system, data sent from the road condition monitoring system via the wide area network. Then, at step 604, the method 600 continues with receiving, by a UI, at least part of the received and processed data. At step 606, the method 600 continues with providing, by the UI, the at least part of the received and processed data to a driver. Also, at step 608, the method 600 continues with receiving, by a first ECU, a first part of the received and processed data. At step 610, the method 600 continues with controlling, by the first ECU, acceleration or deacceleration of a vehicle according to the first part of the data. And, at step 612, the method 600 continues with receiving, by another ECU, another part of the received and processed data. At step 614, the method 600 continues with controlling, by the other ECU, steering of the vehicle according to the other part of the data. As shown, there can be more than two ECUs, and more than two parts of the received and processed data. Thus, other parts of the vehicle can be controlled according to other parts of the received and processed data. For example, although not depicted, the method 600 can continue with receiving, by a second ECU, a second part of the received and processed data. And, then, the method 600 can continue with controlling, by the second ECU, a transmission of the vehicle according to the second part of the data.

In some embodiments, it is to be understood that the steps of methods 400, 500, or 600 can be implemented as a continuous process such as each step can run independently by monitoring input data, performing operations and outputting data to the subsequent step. Also, such steps for each method can be implemented as discrete-event processes such as each step can be triggered on the events it is supposed to trigger and produce a certain output. It is to be also understood that each figure of FIGS. 4 to 6 represents a minimal method within a possibly larger method of a computer system more complex than the ones presented partly in FIGS. 1 to 3. Thus, the steps depicted in each figure of FIGS. 4 to 6 can be combined with other steps feeding in from and out to other steps associated with a larger method of a more complex system.

It is to be understood that a vehicle described herein can be any type of vehicle unless the vehicle is specified otherwise. Vehicles can include cars, trucks, boats, and airplanes, as well as vehicles or vehicular equipment for military, construction, farming, or recreational use. Electronics used by vehicles, vehicle parts, or drivers or passengers of a vehicle can be considered vehicle electronics. Vehicle electronics can include electronics for engine management, ignition, radio, carputers, telematics, in-car entertainment systems, and other parts of a vehicle. Vehicle electronics can be used with or by ignition and engine and transmission control, which can be found in vehicles with internal combustion powered machinery such as gas-powered cars, trucks, motorcycles, boats, planes, military vehicles, forklifts, tractors and excavators. Also, vehicle electronics can be used by or with related elements for control of electrical systems found in hybrid and electric vehicles such as hybrid or electric automobiles. For example, electric vehicles can use power electronics for the main propulsion motor control, as well as managing the battery system. And, autonomous vehicles almost entirely rely on vehicle electronics.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

an artificial intelligence (AI) system; and at least one processor configured to:

receive first movement data from a first vehicle associated with an abrupt movement related to at least one of steering or braking by the first vehicle to avoid a hazardous condition, wherein the first movement data is sent by the first vehicle in response to detection by the first vehicle that the abrupt movement by the first vehicle exceeds a threshold;

receive image data associated with the hazardous condition from the first vehicle, wherein the image data is recorded by at least one camera of the first vehicle after the detection that the abrupt movement exceeds the threshold, the image data includes at least one image of an area within a preselected distance of the first vehicle, and the image data is linked to a geographical position detected by the first vehicle;

receive second movement data from a second vehicle approaching the hazardous condition; and train the AI system using the first movement data, the image data, the geographical position, and the second movement data.

2. The system of claim 1, wherein the AI system is trained using machine learning.

3. The system of claim 1, wherein the AI system includes an artificial neural network, and the processor is further configured to:

generate, by the AI system, advisory data based on the first movement data; and send the advisory data to the second vehicle.

4. The system of claim 1, wherein the camera is configured to record the image data in response to detection by the first vehicle that the abrupt movement by the first vehicle exceeds the threshold.

5. The system of claim 3, wherein the advisory data includes at least one of hazard information or instructional data.

6. The system of claim 3, wherein the advisory data includes the geographical position.

7. The system of claim 6, wherein the advisory data is sent to the second vehicle when the second vehicle is approaching the geographical position.

8. The system of claim 6, wherein the advisory data is sent when the second vehicle is within a preselected distance of the geographical position.

9. The system of claim 3, wherein generating the advisory data comprises identifying at least one pattern in road condition data.

10. The system of claim 3, wherein the advisory data is configured to control at least one of steering, deacceleration, or acceleration of the second vehicle.

11. A system comprising:

an artificial intelligence (AI) system configured to determine geographical positions of hazardous conditions; and at least one processor configured to:

receive first data from a first vehicle at a first geographical position, wherein the first data is sent by the first vehicle in response to detection of an abrupt movement of the first vehicle associated with a hazardous condition, wherein the abrupt movement is determined to exceed a threshold, wherein the first data includes first image data from a camera of the first vehicle, and wherein the first image data includes at least one image of an area within a preselected distance of the first vehicle;

receive, from a second vehicle that is approaching the first geographical position, second data associated with a movement of the second vehicle, wherein the second data includes second image data from a camera of the second vehicle, and wherein the second image data includes at least one image of an area within a preselected distance of the second vehicle; and train the AI system using the first data and the second data.

12. The system of claim 11, wherein the AI system includes an artificial neural network, and the AI system is trained using machine learning.

13. The system of claim 11, wherein the first data comprises position data associated with a position of the first vehicle.

14. A method comprising:

receiving first data from a first vehicle, wherein the first data is sent by the first vehicle in response to detection of an abrupt movement associated with steering or braking of the first vehicle to avoid a hazardous condition, wherein the abrupt movement is determined to exceed a threshold, wherein the first data includes image data from a camera of the first vehicle, wherein the image data includes at least one image of an area within a preselected distance of the first vehicle, and wherein the image is recorded by the camera during a predetermined period of time after the detection of the abrupt movement;

determining, using the first data as input to an AI system, a first geographical position of the hazardous condition;

generating, by the AI system using the first data, advisory data regarding the hazardous condition;

sending the advisory data to a second vehicle that is approaching the first geographical position;

receive, from the second vehicle, second data associated with a movement of the second vehicle; and train the AI system using the first data and the second data.

15. The system of claim 11, wherein the processor is further configured to:

generate advisory data regarding the hazardous condition; and send the advisory data to the second vehicle when the second vehicle is determined to be approaching the first geographical position.

16. The system of claim 11, wherein the processor is further configured to determine, using the first data as input to the AI system, the first geographical position.

17. The system of claim 15, wherein the advisory data includes an image of a hazard rendered from image data.

18. The system of claim 15, wherein the advisory data is configured to provide an alert in a user interface of the second vehicle.

* * * * *